No. 805,941. PATENTED NOV. 28, 1905.
A. ARNESEN.
ANIMAL TRAP.
APPLICATION FILED FEB. 24, 1905.
2 SHEETS—SHEET 1.
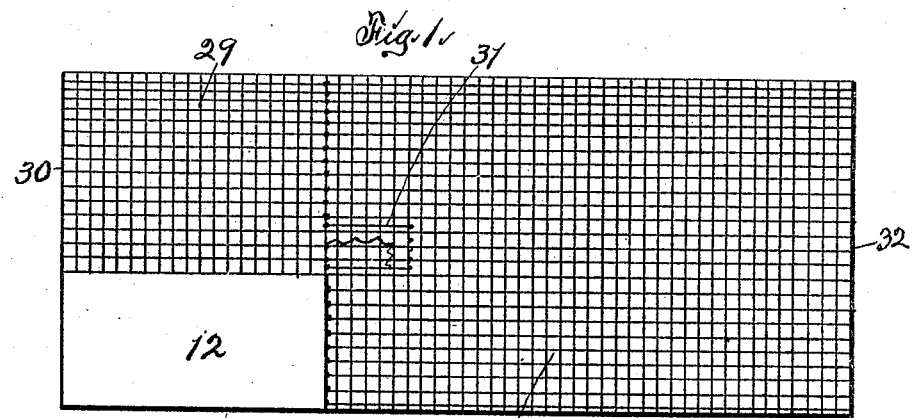
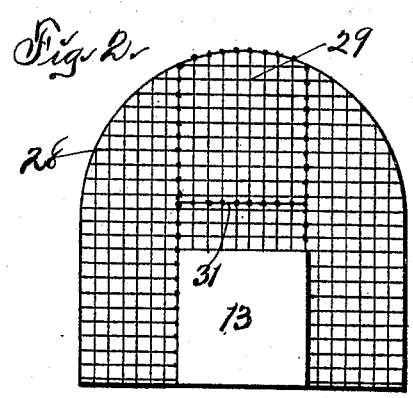 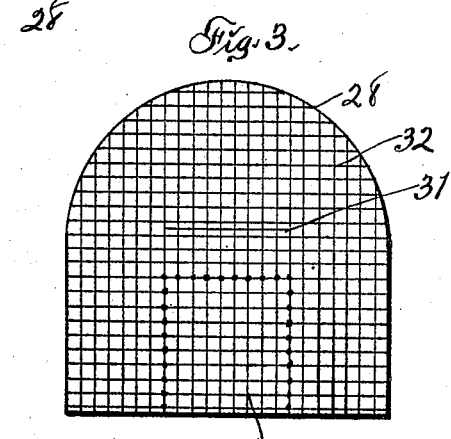
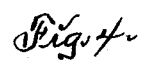
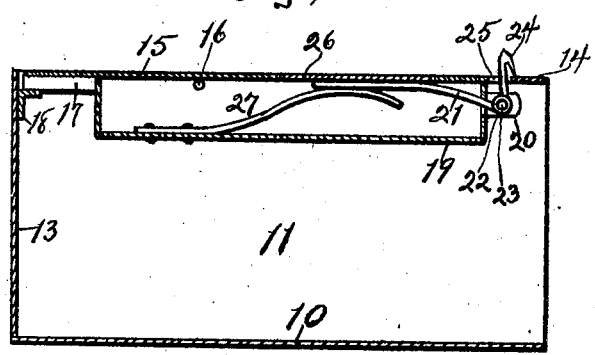
Attest:
W. S. Ellis.
N. W. Winter.
Inventor:
Andrew Arnesen,
By Hedwech Atty

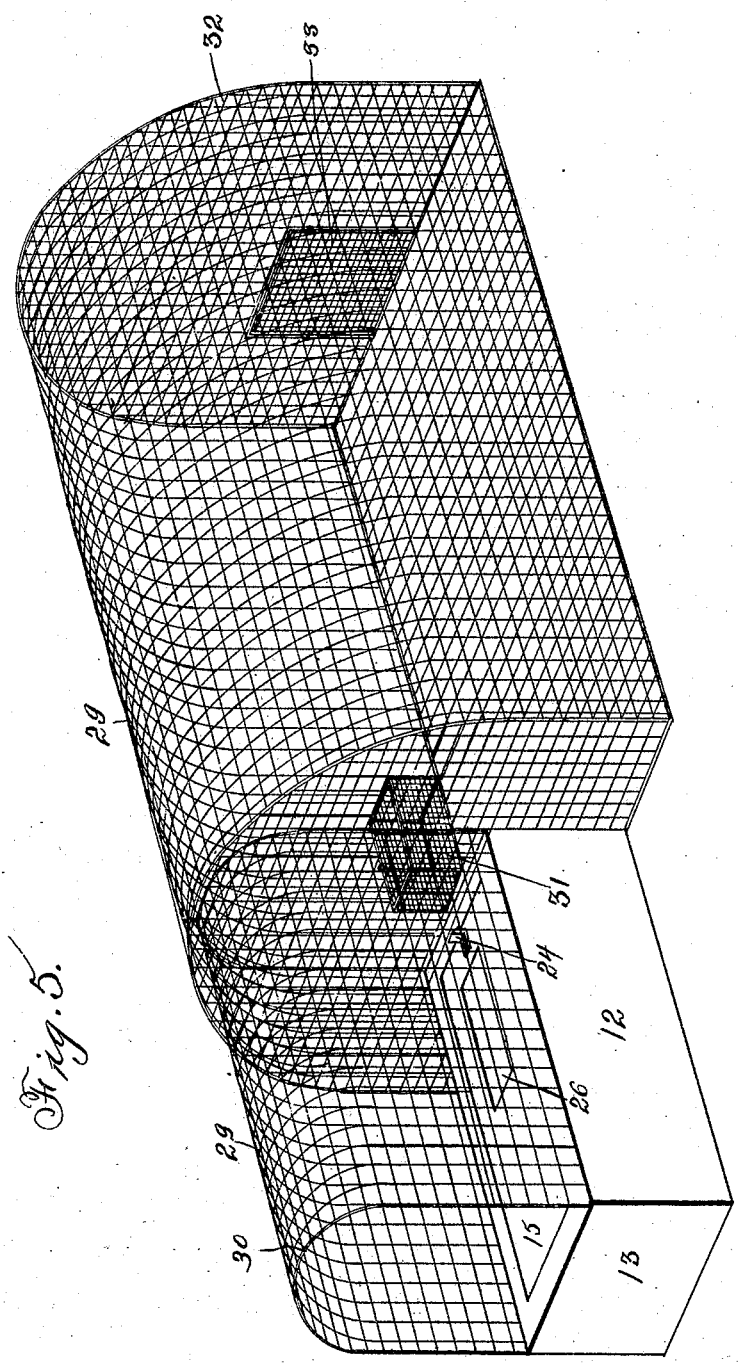

UNITED STATES PATENT OFFICE.

ANDREW ARNESEN, OF DES MOINES, IOWA.

ANIMAL-TRAP.

No. 805,941.      Specification of Letters Patent.      Patented Nov. 28, 1905.

Application filed February 24, 1905. Serial No. 247,201.

*To all whom it may concern:*

Be it known that I, ANDREW ARNESEN, a citizen of the United States of America, and a resident of Des Moines, Polk county, Iowa, have invented a new and useful Animal-Trap, of which the following is a specification.

The object of this invention is to provide an improved construction for self and ever set animal-traps.

My invention consists in the construction, arrangement, and combination of elements hereinafter set forth, pointed out in my claims, and illustrated by the accompanying drawings, in which—

Figure 1 is a side elevation of the complete trap. Figs. 2 and 3 are end elevations of the trap. Fig. 4 is a detail vertical section of the trap device detached from the cage. Fig. 5 is a perspective of the complete device.

In the construction of the device as shown the numeral 10 designates the bottom, 11 12 the side walls, and 13 the outer end wall of a trap device. The trap device is open at its inner end and is formed with a cross-bar 14 adjacent thereto and connecting the upper margins of the side walls 11 12. A trap-door 15 is mounted horizontally in and normally closes the open top of the trap device and is supported pivotally on a rod 16, journaled in the side walls 11 12. It will be observed that the pivot-rod 16 is nearer to the end wall 13 than to the open end of the trap device, and to hold the trap-door 15 normally in horizontal position, a weight 17 is mounted on the lower face of the rear end of said door and overbalances slightly the tendency of the door to tip in opposition to said weight. The weight 17 normally contacts with an angle-stop 18, fixed to the wall 13. A box or housing 19 is mounted on and depends from the lower face of the trap-door 15, and ears 20 project from said housing toward the open end of the trap device. A trigger 21, preferably formed of round wire, with a loop 22 adjacent one end, is pivoted on a pin 23, traversing said loop and mounted in the ears 20. One end portion of the trigger 21 is formed as a hook 24 and projects through a slot 25 in the cross-bar 14 and normally engages said cross-bar and aids the weight 17 in sustaining the trap-door in a horizontal position. An aperture is formed in the forward portion of the trap-door 15, and a trigger-plate 26 is fitted loosely in said aperture and rigidly secured to and supported by the long arm of the trigger 21, which long arm of the trigger extends through a slot in the rear end of the housing. A leaf-spring 27 is mounted in and fixed at one end to the bottom of the housing 19, and said leaf-spring normally engages the long arm of the trigger 21 within the housing and sustains the trigger-plate 26 flush with the trap-door 15. The trap device (indicated generally in Fig. 1 by the numeral 12 and in Fig. 2 by the numeral 13 as designating side and end walls, respectively, thereof) is mounted in and communicates with one end portion of a cage 28. The cage 28 preferably is made of woven-wire or similar perforated or mesh-work material, and preferably is plane on its bottom and arched on its top. An entrance cage 29 is mounted on and arches over the trap device, is open at one end 30, and is fixed to the cage 28 at its opposite end. A bait-box 31 is mounted in the cage 28 adjacent the inner end of the entrance-cage 22, and preferably is provided with a hinged door in its top, whereby bait may be inserted and secured therein. One end portion 32 of the cage 28 is provided with a door 33, through which access may be had to the interior of the cage, especially for the purpose of placing bait in the box 31 and removing animals from the cage.

In the practical use of the device an animal enters the open end of the entrance-cage by walking on the trap-door 15 toward and in search of the bait in the box 31. When the head of the animal is in proximity to the bait in the box 31, one or the other of its fore-paws will apply pressure to the trigger-plate 26 and in so doing will depress the trigger 21 against the resilience of the spring 27 and releases the hook 24 from the cross-bar 14, whereupon the trap-door will oscillate and provide a runway inclined downward toward the open end of the trap device and in communication with the cage 28. The animal will then pass from the trap-door and trap device into the cage 28, and the trap-door will reposition automatically horizontally, as shown. After the animal has passed into the cage 28 it cannot return through the trap device, but must remain in the cage until removed through the door 33.

I claim as my invention—

1. An animal-trap comprising a cage, a door in one end of said cage and an entrance-port in the opposite end of said cage, the trap device communicating with said entrance-port, a door mounted for oscillation in the top of said trap device, a trigger-plate in said door, a trigger carrying said plate, a stop adapted to be engaged by said trigger, and an entrance-cage arched over said trap device.

2. An animal-trap, comprising a cage and an entrance-port at one end and a door at the other end, a trap device communicating with the entrance-port of the cage and comprising a bottom, side walls, an end wall and a cross-bar opposite the end wall, a trap-door pivotally mounted in the top of said trap device, a trigger carried by said door and normally engaging said cross-bar, a trigger-plate in said door carried by said trigger, a housing depending from said door, a spring in said housing engaging said trigger, a weight on said door opposite said trigger, a stop on said end wall adapted to be engaged by said weight, and an entrance-cage arched above said trap device.

Signed by me at Des Moines, Polk county, Iowa, this 9th day of January, 1905.

ANDREW ARNESEN.

Witnesses:
W. C. BALLARD,
S. C. SWEET.